April 9, 1968     E. F. GORDON ETAL     3,376,977
SYSTEM FOR SEPARATING SOLIDS FROM AN OIL-WATER FLUID MIXTURE
Filed Dec. 21, 1964     4 Sheets-Sheet 2
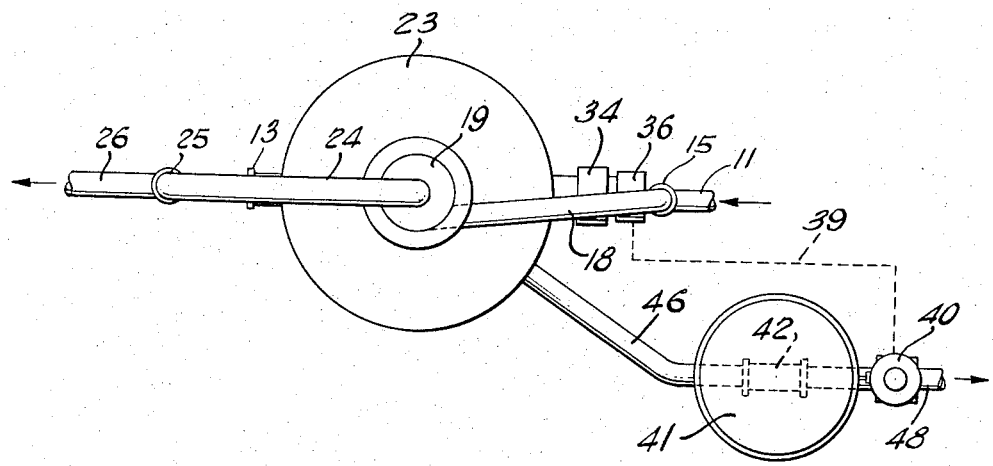
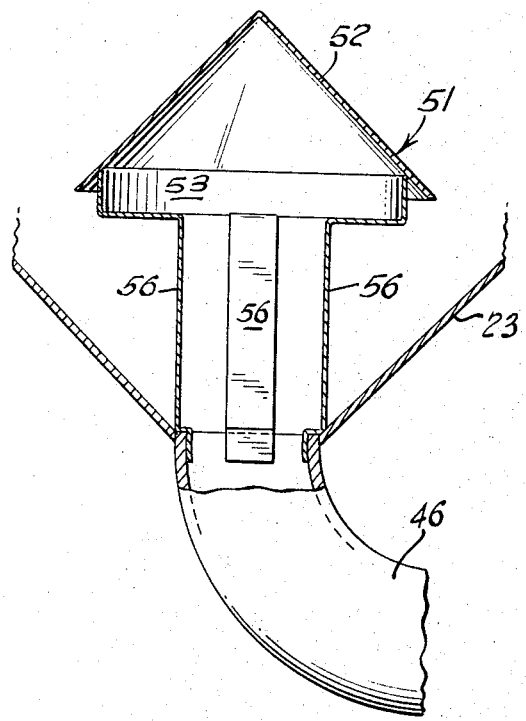
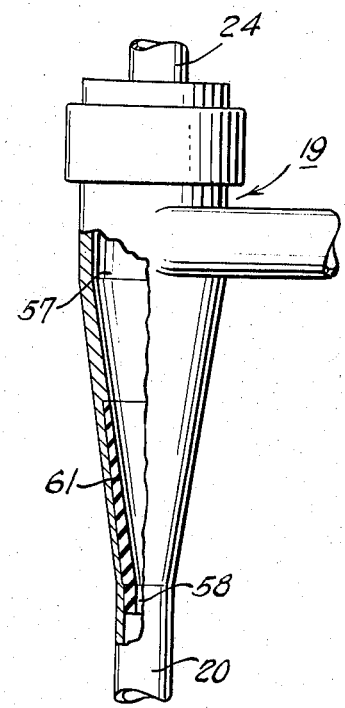

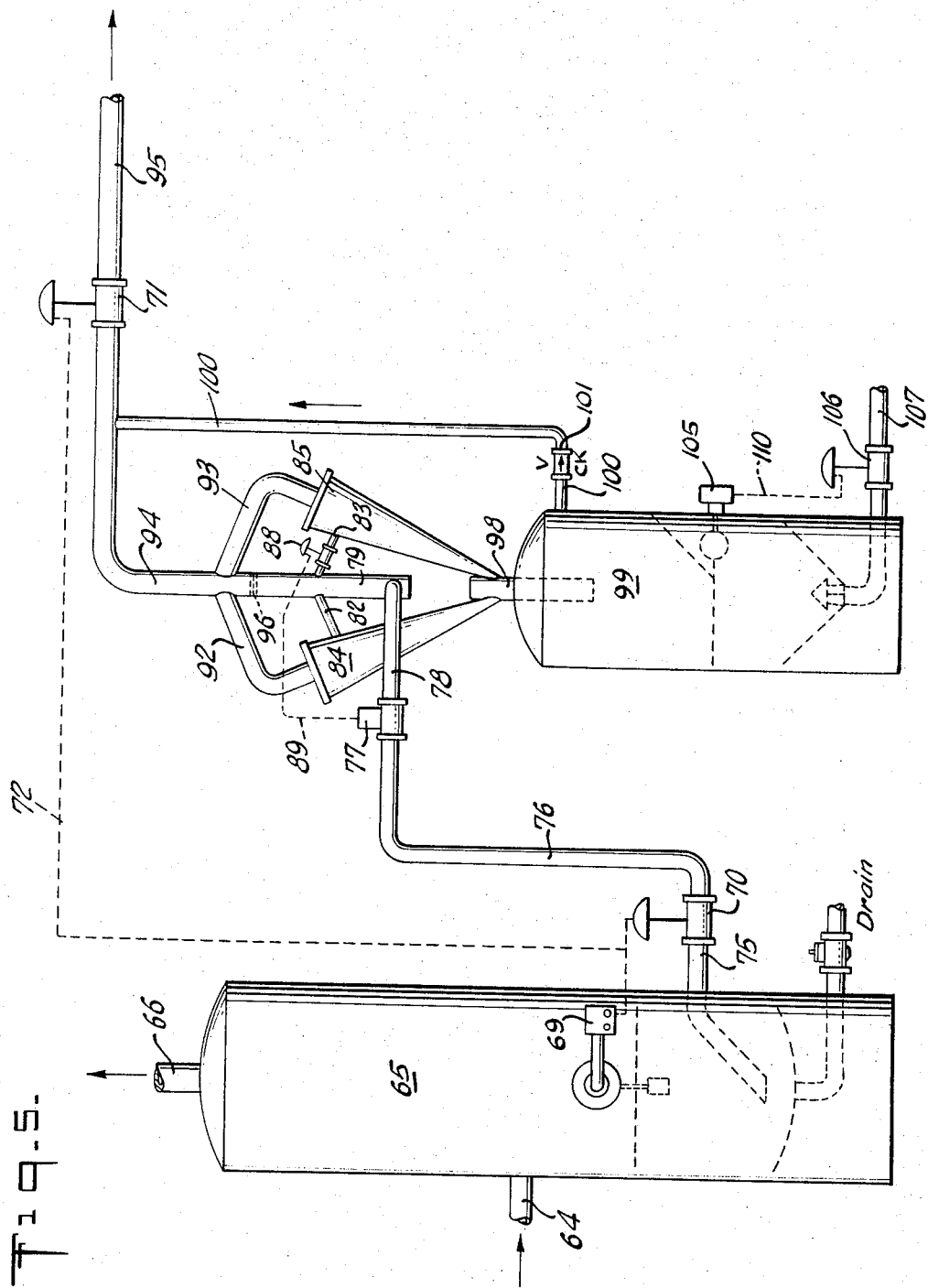

United States Patent Office 3,376,977
Patented Apr. 9, 1968

3,376,977
SYSTEM FOR SEPARATING SOLIDS FROM
AN OIL-WATER FLUID MIXTURE
Elliott F. Gordon, Corpus Christi, Tex., and Merle W.
Brubaker, Gretna, and Charles B. Page, Jr., Metairie,
La., assignors to Texaco Inc., New York, N.Y., a corporation of Delaware
Filed Dec. 21, 1964, Ser. No. 419,803
4 Claims. (Cl. 210—114)

ABSTRACT OF THE DISCLOSURE

A solids-fluid separator system. It contains a cyclone chamber with tangential inlet and top outlet plus limited size bottom discharge orifice. There is an enlarged down spout for receiving cyclone chamber bottom discharge that feeds a sump with controls for flushing water and solids from the bottom while draining oil from the top of the sump.

The foregoing abstract is in compliance with requirements and in no way limits the invention.

This invention is concerned with fluid separations in general and more specifically relates to apparatus for desanding an oil emulsion containing some solid matter as well as some free water therein.

While desanding apparatuses of various sorts have been known for many years, and the use of desanders in connection with crude oil production is generally known; there has not been found any completely satisfactory method or system for desanding crude oil to sufficient extent so as to avoid build-up of fine sand in the treating equipment where the crude oil (which is generally an emulsion of oil and water) is being treated to separate the water from the emulsion.

Consequently, it is an object of this invention to provide a system employing a centrifugal type of desanding unit in combination with a sump for receiving the sand and free water. In this system the sump is automatically controlled to wash out the accumulated sand along with the free water. This system may also be periodically drained to wash out the accumulated sand along with the free water. The system includes improvements such that the removal of solid particles is sufficiently complete so as to practically eliminate any solids which will settle out later on, e.g., in a treating system for crude oil.

Briefly, the invention concerns a system for separating solids from an oil-water fluid mixture containing some solids therein. Such system comprises in combination a centrifugal separation means having an inlet for said mixture and an outlet for said oil, as well as an outlet for said water plus said separated solids. The combination also comprises a sump for receiving fluid mixture from said water outlet, the said sump having a water plus solids outlet at the bottom thereof as well as an oil outlet near the top thereof. In addition, there is a pipe for connecting said centrifuge water and solids outlet to said sump. The foregoing pipe has an inside diameter at least twice the diameter of the said centrifuge water and solids outlet, and extends below the oil-water interface level in said sump. The sump also includes means responsive to said oil-water interface level for controlling the outlet flow of water plus solids from the bottom of said sump, whenever the interface reaches a predetermined level.

Again, briefly, the invention concerns apparatus to carry out a method of desanding an oil emulsion containing free water which comprises the steps of: separating said sand and free water from said emulsion, using centrifugal force, and passing said sand and free water through a flume conduit downwardly into a sump for a sufficient distance to reach the oil-water interface in said sump. The method also comprises the steps of detecting the presence of said oil-water interface when it reaches a predetermined height in said sump; and flushing the sand and free water from the bottom of the sump to dispose of same while making room for further accumulation.

The foregoing and other objects and benefits of the invention will be more fully set forth below in connection with the best mode contemplated by the inventors of carrying out the invention, and in connection with which there are illustrations provided in the drawings, wherein:

FIGURE 2 is a plan view of the system illustrated in FIGURE 1;

FIGURE 3 is an enlarged detail in cross section, showing the structure for a drain cap that is inserted at the outlet for the sump of the system;

FIGURE 4 is an elevation, partly in cross section, showing the structure of a type of commercially available cone for causing centrifugal action to separate the sand and free water from the crude oil;

FIGURE 5 is a schematic diagram showing a different embodiment of a system according to the invention;

Figure 1:
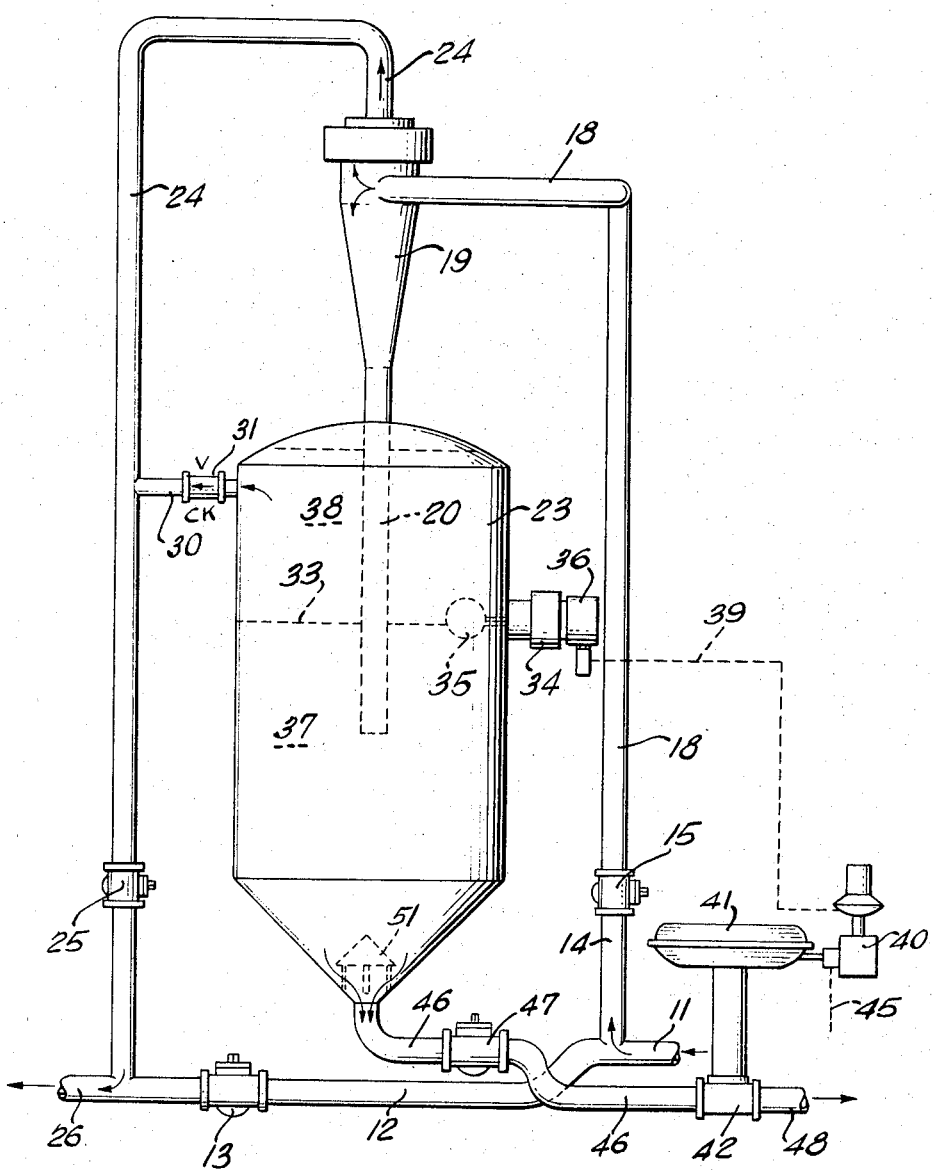
FIGURE 1 is a schematic diagram illustrating a preferred embodiment of one modification showing apparatus which may be employed for carrying out the method, and for embodying the system according to the invention.

FIGURE 6 is a schematic diagram illustrating another embodiment of the invention which employs two separation cones in parallel; and FIGURE 7 is a schematic diagram illustrating still another embodiment of the invention which also employs a multiplicity of separating cones in parallel, and which provides for a wash out structure which will forcefully eject accumulated sand from the bottom of the sump.

Referring to FIGURE 1 there is illustrated a preferred embodiment according to the invention, which includes the elements in combination as follows. It is to be noted that this invention is particularly applicable to separation of sand and solid particles from crude oil, along with free water, prior to the introduction of such crude oil to a treater for complete separation of water that is contained in emulsion with the oil. Thus, while it has been found that heretofore whatever separation means there has been for removing sand prior to treatment, it has been insufficient to remove enough of the sand. Consequently there has been build-up of solid particles, i.e., fine sand in the treating apparatus which has necessitated periodic shutdown for cleaning and removal of such solids.

In FIGURES 1–4, the crude oil containing sand and some free water, as well as an emulsion of water in the oil, is introduced to the system through an inlet pipe 11. This pipe 11 connects with a bypass line 12 that is usually cut off by having a valve 13 therein closed. Thus, when in normal operation the inlet pipe 11 carries the crude oil to be separated to a continuation of the inlet pipe 11, i.e., a vertical pipe 14 that leads to a normally open valve 15. The inlet flow then continues through a pipe 18 that is connected into the side near the top of a centrifugal action cone 19 in a tangential manner. This cone 19 may be commercial equipment, e.g., a desander cone sold by the Salt Water Control, Inc., of Forth Worth, Tex., which is designated as a "SWACO Dorrclone." The interior structure for cone 19 will be described below in more detail in connection with FIGURE 4, but it is sufficient here to note that the centrifugal action of the fluid flow within the cone 19 causes a separation according to the densities of the elements of the fluid being introduced, so that the heavier elements (including any sand or other solid particles as well as free water) tend to be separated from the other constituents of the fluid. The heavy elements such as sand and free water, then flow downward from the bottom of the cone 19 and pass through a pipe 20 that acts as a flume type passageway to direct the flow downward into a sump tank 23.

The lighter portion of the fluid which separates in the cone 19 flows upward out of the top of the cone and passes through a pipe 24 that has a valve 25 connected therein and leads to an outlet line or pipe 26. Of course, the bypass line 12 joins the outlet pipe 26 on the other side of the valve 13.

The heavy constituents of the crude oil being desanded collect in the sump tank 23 after flowing down through the flume pipe 20; and the sand and free water collect in the bottom of sump 23 for disposal therefrom periodically. At the same time the accumulation of any oil which may flow into the sump, takes place above the water and sand in the sump because it is lighter and floats thereon. Such accumulated oil may flow out from the top of the sump tank 23 through a discharge pipe 30 that has a check valve 31 located therein. Discharge pipe 30 is connected into the outlet pipe 24 as illustrated.

Located at an appropriate level on the sump tank 23 there is a control element 34 that includes a float 35, within the sump tank 23, which is actuated by the level of an interface 33 that exists between the water 37 and any oil 38 that has accumulated within the tank 23.

Control element 34 is largely mechanical and actuates a pneumatic controller element 36. Controller 36 is not shown in detail since it may be any appropriate commercial type of controller element. It might take the form of an electrical control element if desired. However, in the illustrated system it is intended to depict a pneumatic system which has a pneumatic pressure line 39 that is illustrated by a dashed line in FIGURES 1 and 2, and connects the controller element 36 with a controlled pneumatic actuator 40. The actuator element 40 will in turn determine the actuation of a pneumatic valve actuator 41, in a known manner. Valve actuator 41, in turn, will determine the position of a valve 42. There is a pneumatic pressure supply line 45 (FIGURE 1) through which pneumatic pressure is introduced to the pneumatic control system.

The separated sand and free water will accumulate in the bottom of the sump tank 23 and whenever the valve 42 is opened the fluid, i.e., water and accumulated sand, will flow out through a drain opening in the bottom of the tank 23. This water and accumulated sand therewith flows via an outlet pipe 46 with a valve 47 therein, to the drain control valve 42. From the other side of valve 42, the discharged water and sand flows for disposal through a discharge pipe 48.

In order to avoid clogging of the drain outlet from sump tank 23, there is a drain cap 51 employed which may take any feasible form, e.g., as illustrated in more detail in FIGURE 3. Thus, the cap 51 may have a conical roof of sheet material 52 that is attached to a band 53 which is supported by four legs 56. Legs 56 are shaped at the bottom end thereof to fit into the drain opening formed by the juncture of the bottom of sump tank 23 with the outlet pipe 46.

FIGURE 4 illustrates some of the details of the structure for a preferred type of desander cone which (as indicated above) may be a commercial unit. There is an interior chamber 57 which may be partially cylindrical, but is conical in shape at the bottom portion thereof. The bottom of the chamber tapers downward to a relatively small diameter orifice or opening 58 that terminates within the pipe 20. The pipe 20 (which is attached to the bottom of the cone 19) has an inside diameter at least twice as great as the diameter of the orifice 58. This arrangement avoids or minimizes any cutting action by the sand particles, on the walls of the flume pipe 20 during the flow of separated sand and free water downward therethrough. There is preferably a replaceable insert portion or liner 61 that occupies the lower end of the tapered part of chamber 57. This insert element 61 may be constructed of a flexible material for ease in replacement thereof. However, it should be somewhat resistant to wear by action of the sand particles flowing over the inner surface thereof. It will be observed that the action within the separator cone 19 involves no moving parts and takes place by reason of the centrifugal force created as the incoming fluid mixture is directed tangentially and caused to flow spirally within the chamber 57. Thus the heavier constituents tend to flow downward by gravity forces, while the lighter fluid comprising oil and emulsion (neither containing any sand) is forced upward and flows out through the pipe 24.

FIGURE 5 illustrates a different modification according to this invention. The illustration shows a system for desanding as it is connected into a crude oil delivery system. Such crude oil delivery system includes a separator prior to the desanding operation. Thus, crude oil is delivered through an input pipe 64 to a separator tank 65, where the gas may separate out and is then drawn off through a pipe 66 extending from the top of the tank. The oil which has sand as well as free water (and some water emulsion) therein, collects at the bottom of tank 65.

The flow of crude oil (after gas separation) as it leaves the tank 65 is controlled by a liquid level sensing device 69. Sensing device 69 controls a pair of valves 70 and 71, which are located before and after, respectively, the desander system (relative to the flow of crude oil therethrough). The control of these two valves 70 and 71 is carried out (as indicated) by a pneumatic control system. This is schematically indicated by a dashed line 72 illustrated.

The crude oil fluid which has collected in the tank 65 and which contains some sand and free water, flows out from the bottom of the tank 65 through a pipe 75 and through the valve 70 to another pipe 76 which in turn leads to a differential pressure sensing unit 77. On the other side of the unit 77 there is another pipe 78 which connects into an inlet manifold 79. From the manifold 79 there are a plurality of input conduits 82 and 83 which lead tangentially into corresponding centrifugal cones 84 and 85 respectively.

It will be observed that there is a control valve 88 located in the input conduit 83. This is controlled by the differential pressure unit 77, as indicated by a dashed line 89. This arrangement provides for changing the capacity of the desanding unit, depending upon the differential pressure as detected at the unit 77.

Each of the desander cones 84 and 85 may be any feasible type of standard equipment, for example that illustrated and described in connection with FIGURE 4.

The oil which is separated in the cones 84 and 85 flows upward through pipes 92 and 93 respectively, which jointly connect into an outlet pipe 94 that connects to the valve 71. The other side of valve 71 has another outlet pipe 95 connected thereto. It will be observed that there is a partition 96 between the inlet manifold 79 and the outlet pipe 94.

The separated sand and free water flows downward from the lower end of the cones 84 and 85 into a joint conduit 98 that extends a substantial distance down into a sump tank 99 and acts as a flume for aiding in the flow, while avoiding re-contamination of the accumulated oil within the sump tank 99. It is important that the flume conduit 98 extend down at least well below the level of the return line for oil that accumulates in the sump.

The sump tank 99 accumulates the sand and free water in the lower portion thereof. Also, any oil or emulsion which may have flown down with the sand and free water, accumulates at the top of the sump 99. There is a flow pipe connection 100 that leads back to the outlet pipe 94. This return pipe 100 includes therein a check valve 101 to insure that the oil only flows outward from, and does not return to the sump.

Within the sump tank 99, as was the case in the modification illustrated in FIGURE 1, there is a float or similar liquid interface detection element 105 that acts as a controller for a valve 106 that is in the drain outlet pipe 107 which extends from the bottom of the sump 99. The control of valve 106 from the element 105 is carried out by means of a pneumatic system, as schematically indicated by a dashed line 110. Of course this could be an electrical control system along with the controls for system throughput (valves 70 and 71 and controls) if desired.

It will be appreciated that whenever the valve 106 is opened, the free water and sand accumulated in the sump tank 99 will flow out rapidly through the outlet pipe 107. Consequently, sand accumulation will be flushed out with the free water flow during such drain operation.

FIGURE 6 illustrates another embodiment of a desanding system per se, in accordance with this invention. The various elements in the system are substantially comparable to the corresponding elements in the previously described modifications and consequently the details thereof will be unnecessary here. There is an inlet pipe 114 which has a bypass pipe 115 connected thereto, which bypass has a normally closed valve 116 connected therein. Inlet pipe 114 has a normally open valve 117 connected therein, and it connects to the tangential inputs for a pair of separator cones 120 and 121. These cones are connected in parallel and merely increase the capacity of the desanding system. Each cone has its individual outlet flume pipe 122 and 123 respectively, which both extend down into a sump tank 124 far enough to reach below the interface between accumulated free water and sand, and the oil or emulsion which also accumulates in the sump tank. At a predetermined height on the sump tank 124, there is a float 127 that will sense the level of the interface (between the free water and oil accumulations thereabove) so as to control the operation of a drain valve 128 that is located in a drain pipe 129. There is also a normally open manually controlled valve 130 connected in the drain pipe 129 for emergency shut down or standby manual operations.

On the oil outlet side of the cones 120 and 121 there is a manifold or joint connection 133 that leads to an outlet pipe 134 which has another normally open manually controllable valve 135 connected therein.

From the top of the sump tank 124 there is a connecting pipe 138 which has a check valve 139 connected therein. Pipe 138 is a return flow line for the oil or emulsion that accumulates in the tank 124, and the check valve 139 is included in order to insure that the flow of accumulated oil or emulsion from the top of the sump 124 is only outward therefrom to join the oil output from the cones 120 and 121.

FIGURE 7 illustrates one more embodiment according to the invention, showing a desanding system per se. In this case the system includes all of the corresponding elements described previously in connection with each of the FIGURE 6, FIGURE 5 and the FIGURE 1 modifications. Consequently, the elements which remain substantially the same need only be referred to very briefly. For example, there is an inlet line 142 which connects to a manifold that provides for the tangential inlets to each of a plurality of cones 143. The separated oil is led out through a manifold 144 to an outlet line 145. Also connected into the outlet line 145 from the top of a sump tank 150, there is an oil outlet pipe 146 with a check valve 147 therein.

Tank 150 has an oil-water interface (float) detector and controller unit 151 which is attached thereto at a predetermined height within the tank.

In this modification there is the added feature of a water jet inlet for forcefully flushing out the sand accumulations from the bottom of the sump tank. This arrangement includes a water inlet line 152 with a valve 153 therein. The inlet line 152 connects to the upper end of a sloping lower chamber section 156 of the sump tank 150. There is the usual drain valve 157 in the outlet or drain line from the lower end of section 156 to control the outflow of water and sand, under the control of float controller element 151. With this arrangement whenever the sump tank 150 is being drained to flush out the accumulated sand and free water there may be applied also a forceful jet of added water which washes down along the lower section 156 of the sump under control of the valve 153 on the water inlet line 152.

*Method*

It is pointed out that a method of desanding an oil emulsion which contains free water and sand, according to this invention, may be carried out in accordance with the following steps. Among the steps included, but not necessarily exclusive of any others, are the following:

(1) Separating the sand and free water from the oil emulsion which included those constituents therein, by using centrifugal force. It will be clear that this step might be carried out by other centrifugal separation apparatus not merely equivalent to the cone type of cyclone separator which is preferred in the systems illustrated.

(2) Passing the said sand and free water through a flume conduit downwardly into a sump. This step accomplishes the beneficial result of aiding the flow of the separated free water and sand, in a particular channel, while providing for adequate cross-sectional area to avoid the high wear or cutting action created by the sand as it flows out from the separator. This channeling which helps the flow, also prevents re-contamination of accumulated oil which is in the top of the sump by the sand and free water flowing into the sump. It may be noted here that a preferred addition to this step includes the passage of the sand and free water through a flume having sufficient length to extend down as far as the coil-water interface in the sump.

(3) Detecting the presence of the oil-water interface in the sump when it reaches a predetermined height therein. This step, while ordinarily carried out with a float which is designed for actuation by the water and will thus detect the presence of the interface, may be carried out by many other means such as that of merely having a gauge glass or observation port in the sump when then would allow a manual actuation following the detection by visual observation.

(4) Flushing the sand and free water from the bottom of the sump to dispose of the same, and thus make room for the accumulation of additional sand and free water as it is separated. It will be observed that this step may be accomplished with a mere draining of the sump so that the free water accumulation therein tends to flow out rapidly and thus flush the sand out therewith. On the other hand, there may be an actual additional source of flushing fluid (such as water) that may be applied to carry out this step. An arrangement employing such an additional source is illustrated in the FIGURE 7 schematic diagram showing.

(5) Drawing off the excess oil accumulations from the top of the sump. As illustrated in the various modifications shown, this is most simply carried out by providing a flow line from the top of the sump tank to the outlet line of separated oil, with a check valve included in such connection. Clearly the step might be carried out in manual arrangements. Thus, the drawing off of the accumulated oil could be done with a separate tank (not shown) for receiving the oil as drawn off; and, of course, the drawing off might be carried out by means of an access opening (not shown) within which insertion of any feasible type of equipment could be made for either dipping out the excess oil or syphoning it off or in other similar ways accomplishing the drawing off thereof.

It will be appreciated that if the crude oil emulsion is not stable enough for actuation of the interface controller, the periodic flushing action might be carried out by using any feasible equipment (not shown) that would act strictly on a time basis, e.g., by using a time-cycle controller.

While particular embodiments of the invention have been described above in considerable detail in accordance with the applicable statutes, this is not to be taken as in any way limiting the invention but merely as being descriptive thereof.

We claim:

1. A system for separating solids from an oil-water fluid mixture containing some solids therein comprising in combination
   centrifugal separation means having an inlet for said mixture,
   an outlet for said oil, and
   an outlet for said water plus said separated solids;
   a sump for receiving fluid mixture from said water outlet,
   said sump having a water plus solids outlet at the bottom thereof, and
   an oil outlet near the top thereof;
   a pipe for connecting said centrifuge water and solids outlet to said sump,
   said pipe extending below an oil-water interface level in said sump, and
   said pipe having an inside diameter at least twice the diameter of said centrifuge water and solids outlet and extending at least a substantial distance below the level of said sump oil outlet;
   means forming said oil-water interface level within said sump from said centrifuge fluid mixture; and
   means responsive to said oil-water interface level for controlling the outlet flow of water plus solids from the bottom of said sump whenever the interface reaches a predetermined level.

2. A system according to claim 1 wherein said sump oil outlet connects to said centrifuge outlet for said oil and further including a check valve for preventing back flow of oil therethrough into said sump.

3. A system according to claim 2 wherein said centrifugal separation means comprises a plurality of inverted cones connected in parallel.

4. A system for separating solids from an oil-water fluid mixture containing some solids therein comprising in combination
   cyclone type separation means having an inverted conical chamber with a tangential inlet for said mixture located at the large diameter end of said chamber,
   an outlet for said oil located centrally at the top of said separation means,
   an outlet for said water plus said separated solids located at the small diameter end of said chamber comprising a replaceable insert forming an orifice;
   a sump for receiving fluid mixture from said orifice,
   said sump having a water plus solids outlet at the bottom thereof including a drain cap thereon to avoid clogging of the outlet,
   an oil outlet connected to said sump near the top thereof and extending for connection with said separation means oil outlet,
   a check valve in said last named oil outlet connection to prevent back flow of oil into said sump,
   a pipe for connecting said orifice to said sump,
   said centrifuge fluid mixture forming an oil-water interface within said sump,
   said pipe having an inside diameter at least twice the diameter of said orifice and extending below the oil-water interface level in said sump; and
   means responsive to said oil-water interface level for controlling the outlet flow of water plus solids from the bottom of said sump comprising
   a motor controlled valve in said water plus solids outlet from the sump,
   a float means responsive to said oil-water interface level and located at a predetermined height in said sump, and
   control means for actuating said motor controlled valve including means responsive to said float means for opening said valve whenever the interface reaches a predetermined level.

References Cited

UNITED STATES PATENTS

| | | |
|---|---|---|
| 1,919,653 | 7/1933 | Hill |
| 2,093,645 | 9/1937 | Podbielniak _____ 210—512 X |
| 2,754,968 | 7/1956 | Vegter et al. |
| 2,757,582 | 8/1956 | Freeman et al. _____ 55—177 X |
| 3,064,410 | 11/1962 | Wright _____ 55—177 X |
| 3,273,318 | 9/1966 | Meyer _____ 55—176 X |

OTHER REFERENCES

The Dorr Clone, bulletin N. 2501, The Dorr Oliver Co., Stamford, Conn., 5 pages, 1952.

REUBEN FRIEDMAN, *Primary Examiner.*

J. ADEE, *Assistant Examiner.*